United States Patent
Janecek et al.

(10) Patent No.: US 9,236,773 B2
(45) Date of Patent: Jan. 12, 2016

(54) SEGMENTED STATOR WITH CONTROLLED EDDY CURRENT

(71) Applicant: Electric Torque Machines, Inc., Flagstaff, AZ (US)

(72) Inventors: Thomas Janecek, Flagstaff, AZ (US); Tyler Williams, Flagstaff, AZ (US); John Dyer, Flagstaff, AZ (US)

(73) Assignee: Electric Torque Machines Inc, Flagstaff, AZ (US)

( * ) Notice: Subject to any disclaimer, the term of this patent is extended or adjusted under 35 U.S.C. 154(b) by 201 days.

(21) Appl. No.: 13/969,447

(22) Filed: Aug. 16, 2013

(65) Prior Publication Data

US 2015/0048712 A1 Feb. 19, 2015

(51) Int. Cl.
*H02K 1/12* (2006.01)
*H02K 1/14* (2006.01)
*H02K 15/02* (2006.01)
*H02K 21/12* (2006.01)

(52) U.S. Cl.
CPC ............. *H02K 1/145* (2013.01); *H02K 1/12* (2013.01); *H02K 15/02* (2013.01); *H02K 15/022* (2013.01); *H02K 21/125* (2013.01); *H02K 2201/12* (2013.01)

(58) Field of Classification Search
CPC ......... H02K 1/12; H02K 1/145; H02K 15/02; H02K 15/022; H02K 21/125
See application file for complete search history.

(56) References Cited

U.S. PATENT DOCUMENTS

| | | | |
|---|---|---|---|
| 6,211,595 B1 * | 4/2001 | Nose | G11B 19/2009 310/164 |
| 6,229,239 B1 * | 5/2001 | Lucidarme | H02K 1/2706 310/156.53 |
| 7,851,965 B2 | 12/2010 | Calley et al. | |
| 7,868,508 B2 | 1/2011 | Calley et al. | |
| 7,923,886 B2 | 4/2011 | Calley et al. | |
| 8,053,944 B2 * | 11/2011 | Calley | H02K 21/125 310/181 |
| 8,193,679 B2 * | 6/2012 | Calley | H02K 1/246 310/181 |
| 8,222,786 B2 * | 7/2012 | Calley | H02K 1/145 310/156.02 |
| 8,395,291 B2 * | 3/2013 | Calley | B62M 6/65 310/156.02 |
| 8,405,275 B2 * | 3/2013 | Calley | H02K 1/145 310/216.004 |
| 8,836,196 B2 * | 9/2014 | Calley | H02K 1/12 310/216.133 |
| 8,952,590 B2 * | 2/2015 | Calley | B62M 6/65 310/216.008 |
| 2002/0074891 A1 * | 6/2002 | Gieras | H05K 1/145 310/254.1 |
| 2010/0109452 A1 * | 5/2010 | Calley | H02K 1/246 310/46 |
| 2011/0169366 A1 | 7/2011 | Calley et al. | |
| 2011/0169381 A1 | 7/2011 | Calley et al. | |
| 2012/0119599 A1 | 5/2012 | Calley et al. | |

(Continued)

*Primary Examiner* — Dang Le
(74) *Attorney, Agent, or Firm* — Invention To Patent Services; Alex Hobson

(57) ABSTRACT

An electrical machine includes a rotor with a rotational axis, a coil arranged circumferentially with respect to and fully encircling the rotational axis, and a stator assembly. The stator assembly includes first and second lamination stacks comprising associated pluralities of laminae, the stacks being arranged circumferentially with respect to the rotational axis on opposing sides of the coil for conducting magnetic flux. The stacks are configured with gaps generally radially through the laminae thereof, defining separate circumferential segments in each laminae, to prevent creating a continuous electrical circuit around the rotational axis in the segments. Each laminae has a connecting ring spaced radially from the segments, and beams connecting the segments to the ring as a unitary piece. Back return elements extend axially between the stacks to provide a flux path therebetween, and are positioned circumferentially between adjacent parts of the beams and radially between the segments and the ring.

20 Claims, 13 Drawing Sheets

(56) References Cited

U.S. PATENT DOCUMENTS

| | | |
|---|---|---|
| 2012/0119609 A1 | 5/2012 | Janecek et al. |
| 2012/0119610 A1 | 5/2012 | Calley et al. |
| 2012/0234108 A1 | 9/2012 | Janecek et al. |
| 2012/0235519 A1 | 9/2012 | Dyer et al. |
| 2012/0235668 A1 | 9/2012 | Janecek et al. |
| 2013/0002061 A1 | 1/2013 | Janecek et al. |
| 2013/0113320 A1* | 5/2013 | Calley .................... H02K 2/145 310/156.02 |

* cited by examiner

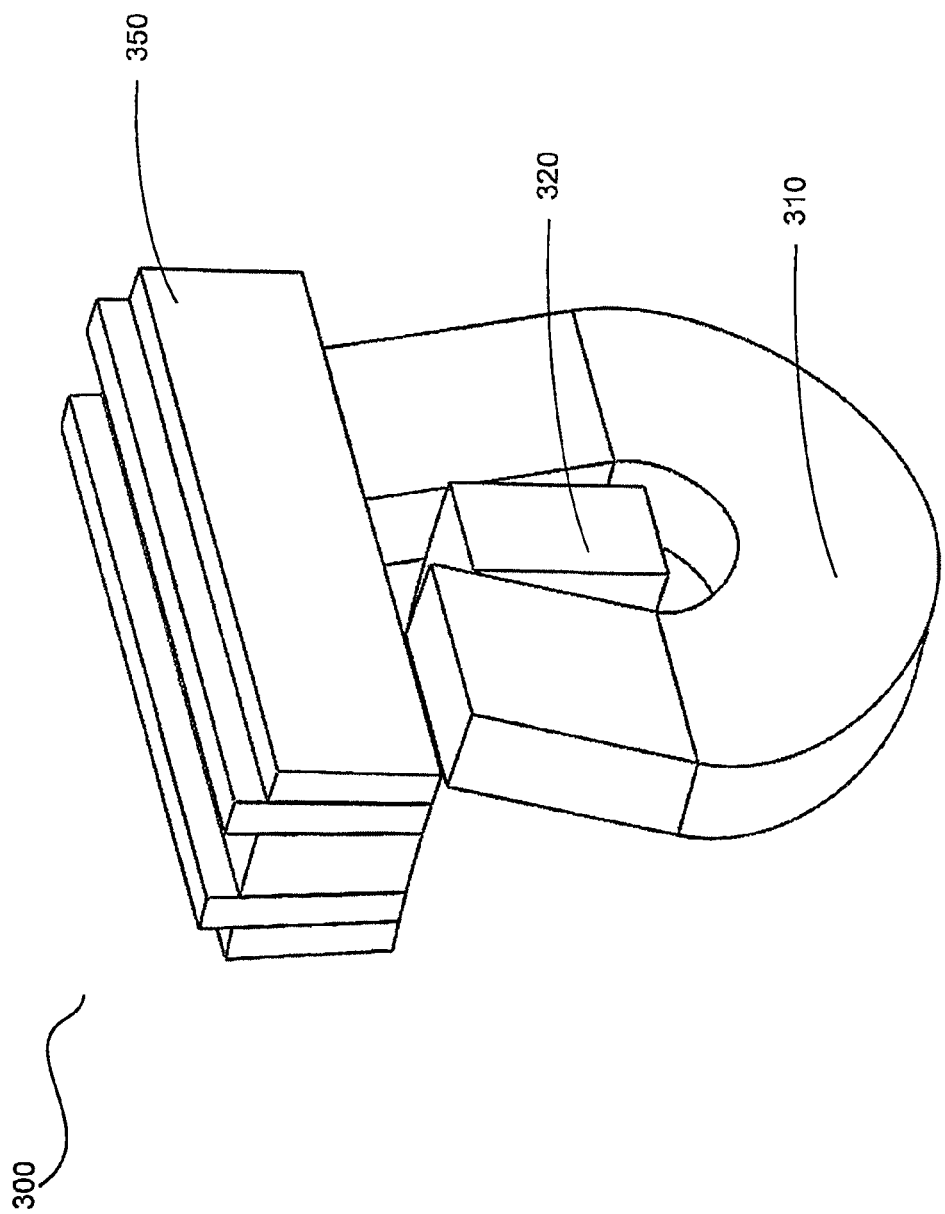

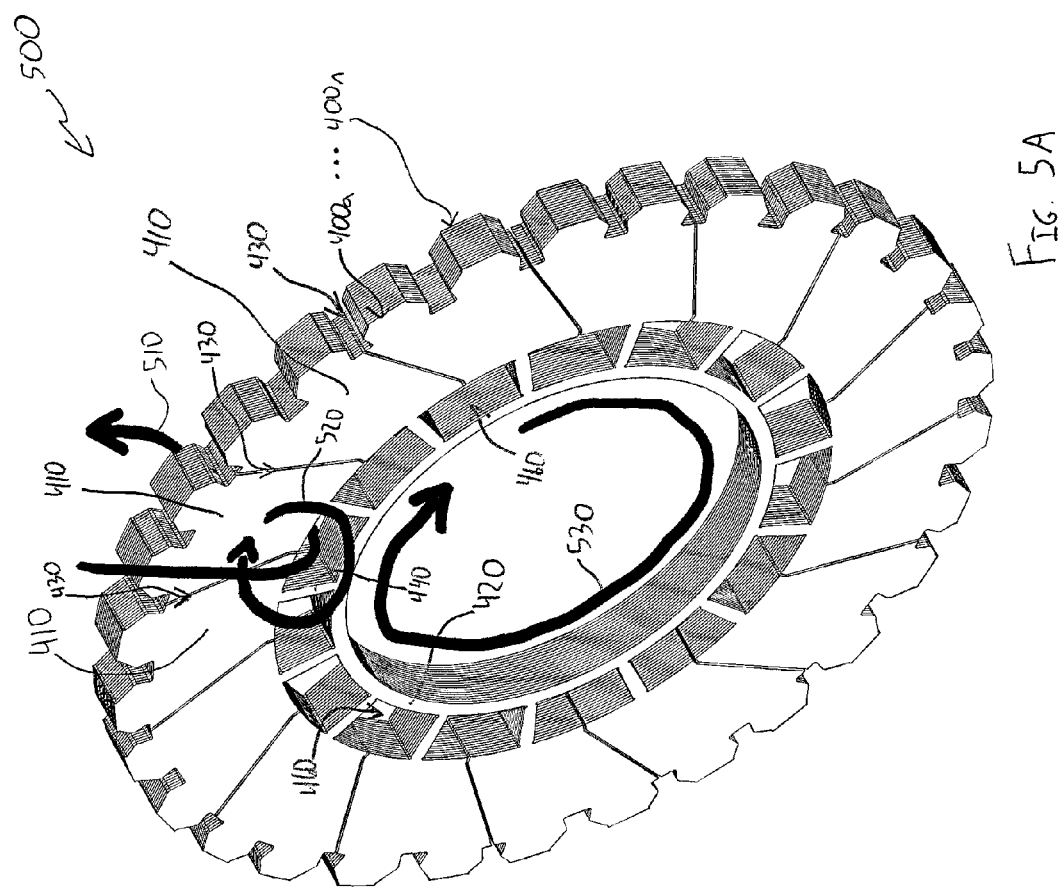

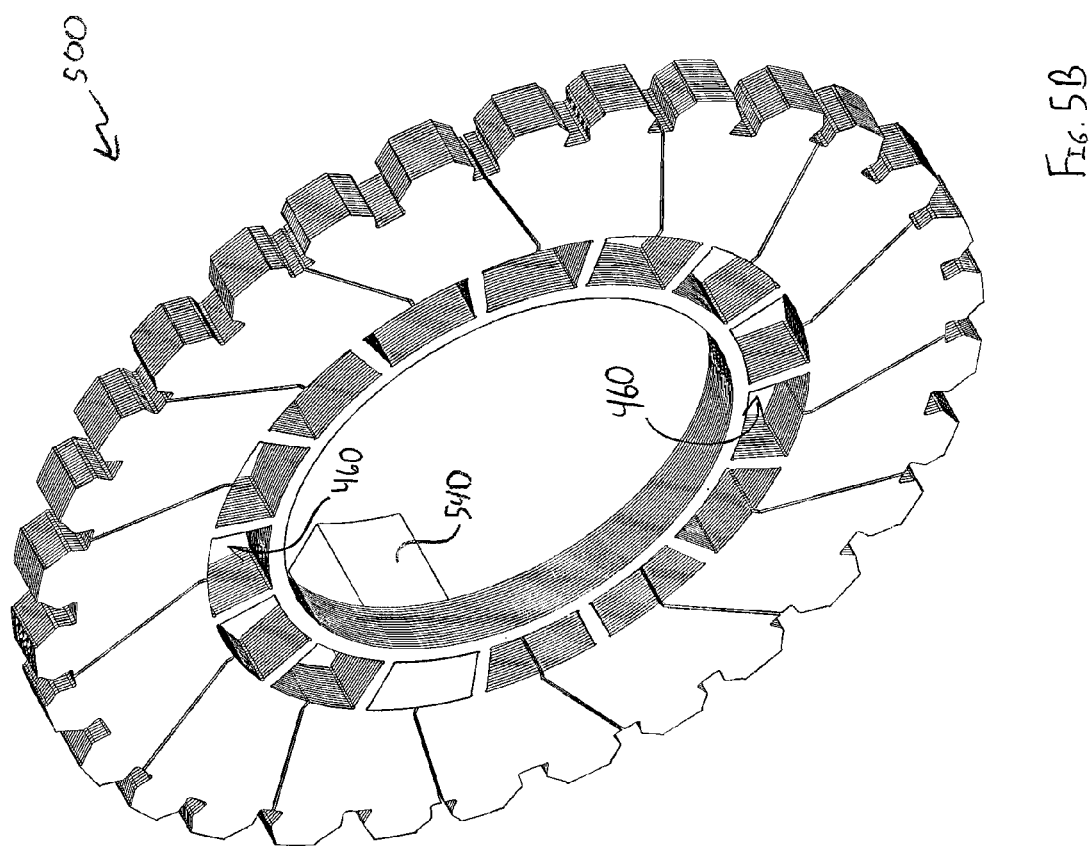

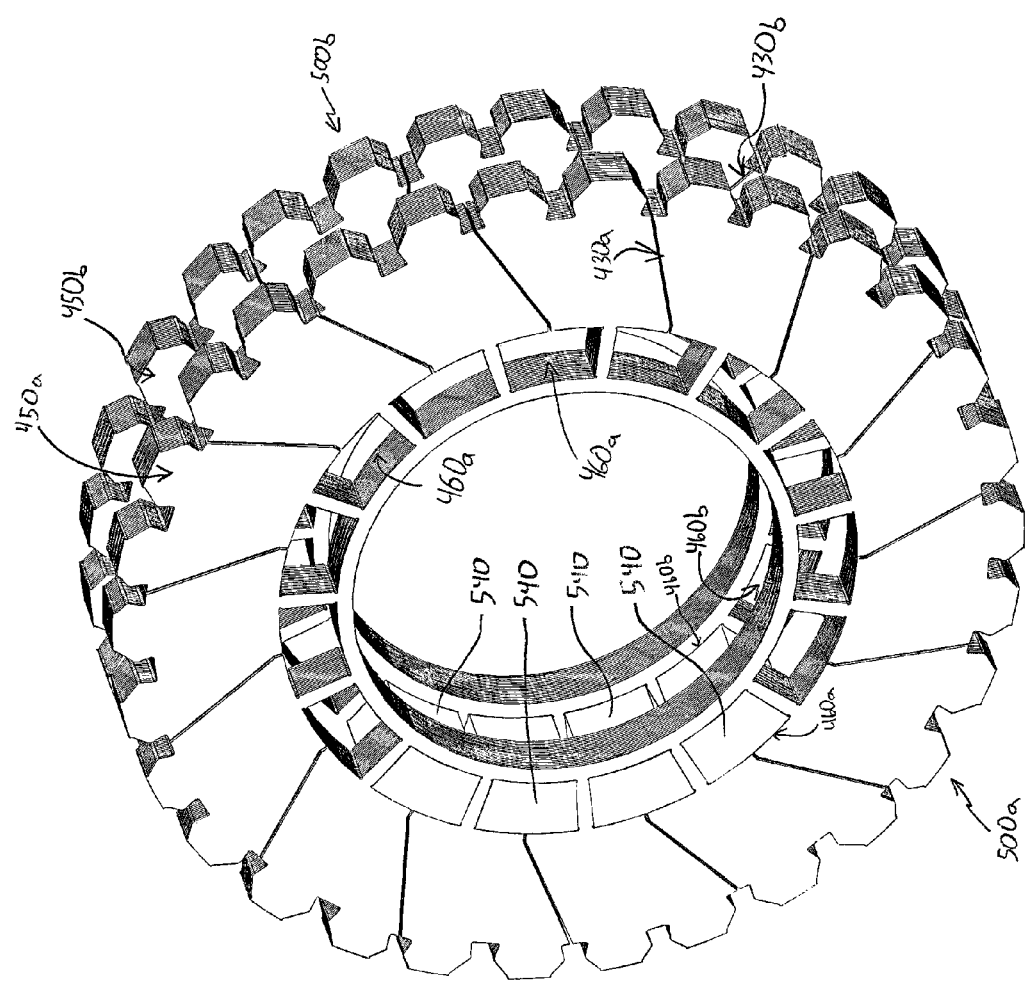

SEGMENTED STATOR WITH CONTROLLED EDDY CURRENT

This application is related to U.S. patent application Ser. No. 13/797,671, which claims the benefit of U.S. patent application Ser. No. 13/291,373, now U.S. Pat. No. 8,405,275, which itself claims priority from provisional applications 61/453,075, 61/414,781, 61/414,769, and 61/414,774. Each of these applications is incorporated herein by reference in its entirety.

FIELD OF THE INVENTION

The present invention relates generally to stators or rotors for electrical machines.

BACKGROUND OF THE INVENTION

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. Among other things, the present application relates to an improved stator for a transverse flux machine, configured to reduce detrimental effects of eddy currents in the magnetic fields of the electric motor.

SUMMARY OF THE INVENTION

According to one aspect of this disclosure, an electrical machine includes a rotor for rotation about a rotational axis, an electroconductive coil arranged circumferentially with respect to and fully encircling the rotational axis, and a stator assembly. The stator assembly includes a first lamination stack comprising a first plurality of laminae, the first stack being arranged circumferentially with respect to the rotational axis on a first side of the coil for conducting magnetic flux, and a second lamination stack comprising a second plurality of laminae, the second stack being arranged circumferentially with respect to the rotational axis on a second side of the coil for conducting magnetic flux. The first lamination stack and the second lamination stack are each configured with a plurality of gaps generally radially through the laminae thereof, the gaps in the laminae of each lamination stack defining a plurality of separate circumferential segments in each laminae, to prevent a continuous electrical circuit around the rotational axis from being created in the plurality of separate circumferential segments. The electrical machine is at least one of a transverse flux machine or a commutated flux machine. Each laminae has a connecting ring spaced radially from said circumferential segments thereof and radially extending beams connecting said circumferential segments to said connecting ring as a unitary piece. A plurality of back return elements arranged circumferentially with respect to the rotational axis and extending axially between the first and second lamination stacks to provide a magnetic flux path therebetween, each back return element being positioned circumferentially between adjacent parts of said radially extending beams and radially between said segments and said connecting ring.

According to another aspect of this disclosure, a method of manufacturing a stator for assembly with a rotor to form an electrical machine includes forming a plurality of laminae, each laminae being formed of a unitary piece comprising a plurality of gaps defining a plurality of separate circumferential segments therein, coupled to a connecting ring spaced radially from the circumferential segments by radially extending beams, the gaps extending radially through each of the plurality of laminae to prevent a continuous electrical circuit around the rotational axis from being created in the laminae. The method also includes forming first and second lamination stacks from the plurality of laminae. The method also includes assembling the first lamination stack circumferentially with respect to a rotational axis of the electrical machine on a first side of an electroconductive coil for conducting magnetic flux. The method additionally includes assembling the second lamination stack circumferentially with respect to the rotational axis on a second side of the electroconductive coil for conducting magnetic flux. The method further includes arranging a plurality of back return elements circumferentially with respect to the rotational axis and extending axially between the first and second lamination stacks to provide a magnetic flux path therebetween, each back return element being positioned circumferentially between adjacent parts of said radially extending beams and radially between said segments and said connecting ring.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of electrical machines in accordance with one or more embodiments are shown in the drawings, in which like reference numerals designate like elements. The drawings form part of this original disclosure in which:

FIG. 3C illustrates an exemplary face engaged transverse flux configuration in accordance with an exemplary embodiment;

FIG. 5A illustrates an embodiment of a lamination stack comprising a plurality of the laminae of FIG. 4;

FIG. 5B illustrates assembly of back return material into the lamination stack of FIG. 5A;

FIG. 5C illustrates the back return material joining a plurality of lamination stacks;

DETAILED DESCRIPTION OF THE ILLUSTRATED EMBODIMENT(S)

Figure 1B:
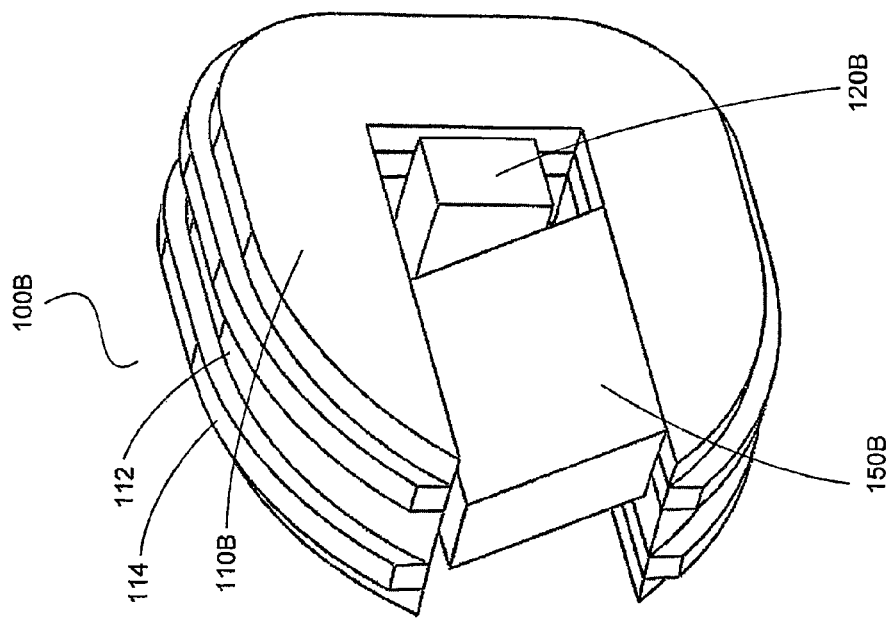
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example brushless DC motors, synchronous AC motors, and/or the like, may suffer from various deficiencies. For example, many prior electric motors and associated motor controllers as utilized in light electric vehicles (LEVs) have combined efficiencies of only up to about 80%. Additionally, the efficiency may fall off sharply as torque output and/or RPM increases. For LEVs, efficiency typically drops as torque goes up and RPM goes down. Thus, range of the LEV is reduced, due to the power lost to inefficiencies of the system. Additionally, such motors and controllers often offer only limited power output in order to maintain efficiency, resulting in reduced performance under demanding loads such as hill climbing.

Yet further, many prior electric motors have offered limited torque density. As used herein, "torque density" refers to Newton-meters of continuous torque produced per kilogram of active electrical and magnetic materials in the motor. In an exemplary embodiment, continuous torque may be defined as a level of output torque that produces a maximum (spatial) equilibrium temperature of 100 degrees Celsius in the motor stator, responsive to a load of duty type S1 as defined in International Electrotechnical Commission (IEC) standard 60034-1, given ambient temperature of 25 degrees Celsius and airflow of 8 kilometers per hour around the motor.

For example, many prior electric motors are configured with a torque density of between about 0.5 Newton-meters per kilogram and about 3 Newton-meters per kilogram. Consequently, a motor of sufficient torque and/or power for a particular application may be difficult or even impossible to fit in an available area, for example when a motor sized to produce sufficient torque becomes too massive to fit in a confined space. In the case of e-bikes, the associated space constraints (for example, the limited space available in a bicycle wheel hub) often result in inclusion of comparatively underpowered and/or overweight motors.

In contrast, efficient, compact, and/or torque-dense electric motors, including motors for e-bikes and other LEVs, may be achieved by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the electrical machine operates, the electrical machine may be a pure "transverse" flux machine. In another exemplary embodiment, when a magnet and/or flux concentrating components are on a stator and/or are held stationary as the electrical machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 1A:
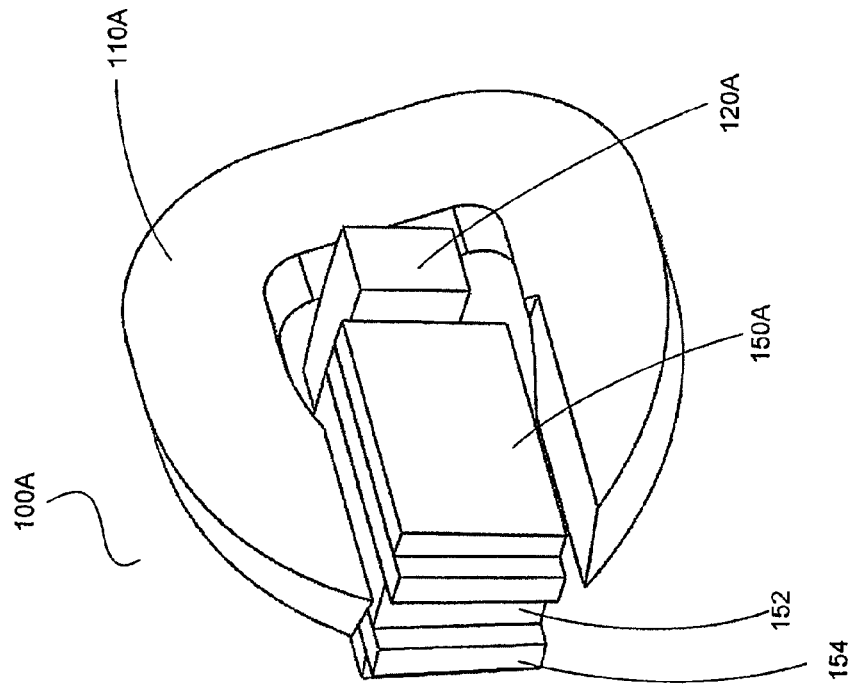
FIG. 1A illustrates an exemplary transverse flux machine in accordance with an exemplary embodiment.

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Figure 2B:
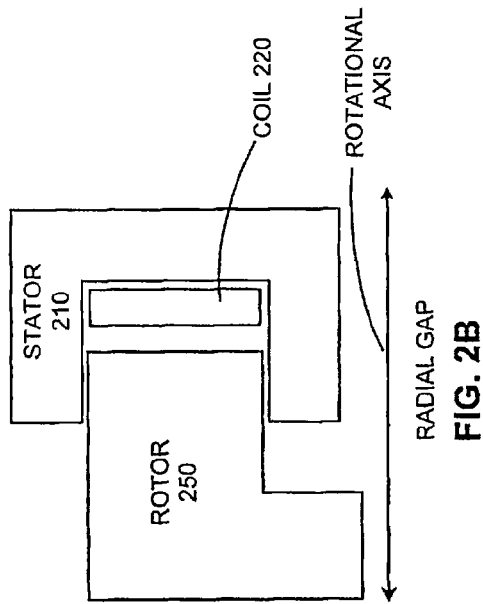
FIG. 2B illustrates an exemplary radial gap configuration in accordance with an exemplary embodiment.
Figure 2A:
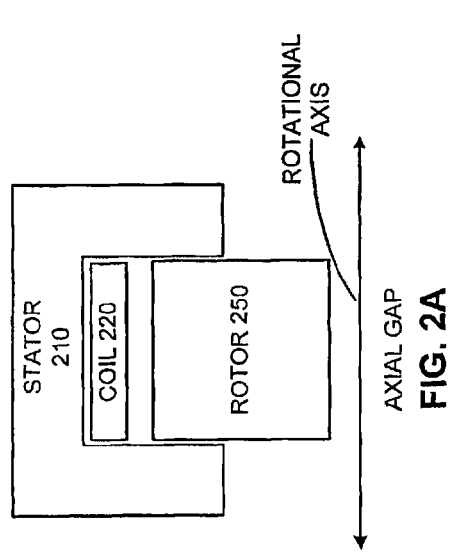
FIG. 2A illustrates an exemplary axial gap configuration in accordance with an exemplary embodiment.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3B:
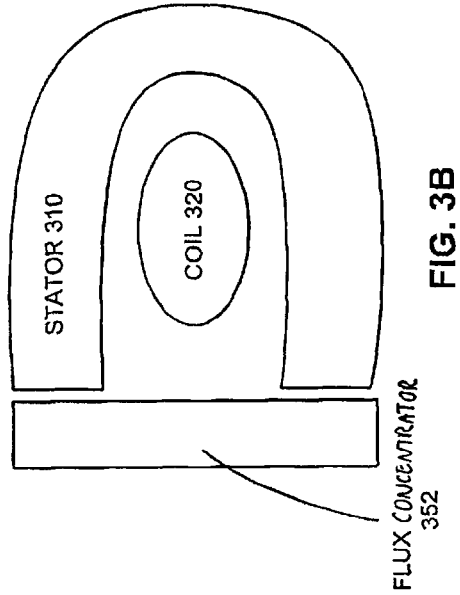
FIG. 3B illustrates an exemplary face engaged configuration in accordance with an exemplary embodiment.
Figure 3A:
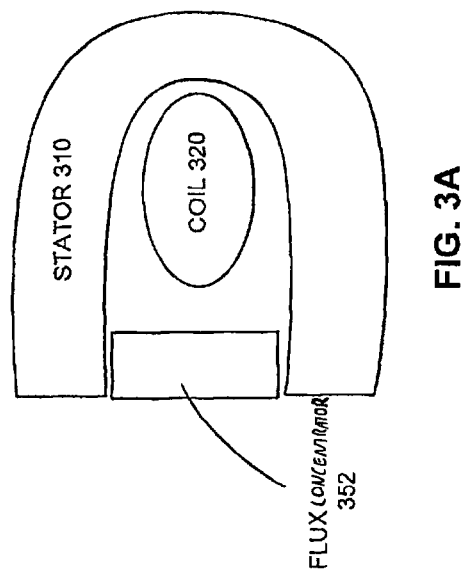
FIG. 3A illustrates an exemplary cavity engaged configuration in accordance with an exemplary embodiment.

With reference now to FIG. 3A, a flux concentrator 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux concentrator 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Principles of operation for various transverse flux machines and/or commutated flux machines, and various other principles related thereto, may be found in one or more of U.S. Pat. Nos. 7,851,965, 7,923,886, 7,868,508, 8,053, 944, 8,405,275, and U.S. Patent Application Publication Nos. 2011/0169381, 2011/0169366, 2012/0119599, 2012/0119609, 2012/0119610, 2012/0234108, 2012/0235519, 2012/0235668, 2013/0002061, 2013/0113320. Each of these patents and printed publications are hereby incorporated herein by reference in its entirety. It may be appreciated that the present disclosure may suitably be combined with one or more of the teachings in these patents and printed publications. For example, principles of the present disclosure may suitably be combined with principles electric motor design and components, including but not limited to those therein.

As described in U.S. Pat. No. 8,405,275, incorporated herein by reference in its entirety, a stator for an electrical machine, such as a transverse flux machine and/or commutated flux machine, may comprise a lamination stack (e.g., a plurality of laminae) formed from a generally planar material configured to transmit magnetic flux. Such laminae may be in a shape configured to facilitate transmission of magnetic flux in a desired manner and/or direction. In an embodiment, the laminae may be assembled side by side into the lamination stack (e.g., as side laminations). In various exemplary embodiments, laminae may comprise a generally ring-shaped structure. It may be appreciated that the ring shaped structure may be arcuate, polygonal, a combination thereof, or of any other appropriate shape or configuration. Moreover, such laminae may be configured with one or more teeth. In an exemplary embodiment, teeth are located on the outer edge of the laminae and/or on the inner edge of the side lamination. In various exemplary embodiments, teeth may be disposed to generally face the radial interior of the ring (for example, in connection with the use of an "inner" rotor in a radial gap configuration), the radial exterior of the ring (for example, in connection with the use of an "outer" rotor in a radial gap configuration), and/or an axial side of the ring (for example, in connection with the use of a "side by side" rotors and stators in an axial gap configuration).

The laminae typically comprise a material suitable for transmission of magnetic flux. In various exemplary embodiments, laminae may comprise silicon steel. In an exemplary embodiment, the laminae may comprise M19 silicon steel. Laminae may also comprise cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Moreover, laminae may comprise any suitable material having a desired electrical resistivity and/or magnetic permeability.

Other details regarding assembly of the laminae into a stack, which may be assembled into a stator for an electrical machine, are also described in U.S. Pat. No. 8,405,275. It may be appreciated that the teachings therein may be utilized for a rotor of an electrical machine as well. As further described therein, when utilized in certain electrical machines, continuous (for example, ring-shaped) laminae and/or lamination stacks can suffer from undesirable losses due to flux linking of certain laminae, as explained in more detail below. Stated generally, in certain electrical machines, including in transverse flux machines and/or commutated flux machines, any component or combination of components which provide a closed electrical circuit passing through a magnetic flux loop will have an electric current induced therein responsive to variations in the magnetic field. Typically, it is desirable to induce an electrical current in a conductive coil of an electrical machine (i.e. a portion of the electrical machine intended to supply an output current and/or provide an input current), but undesirable to induce an electrical current in other portions of the machine (e.g., portions of the rotor and/or stator intended to facilitate switching of magnetic flux). Such currents induced outside a conductive coil can lead to unwanted eddy currents, thermal losses, and even device failure.

Accordingly, to mitigate the effects of eddy currents and other such unwanted results, U.S. Pat. No. 8,405,275 describes modifying laminae to interrupt a continuous electrical circuit therein. Specifically, the laminae may include one or more cuts or gaps, therein, which may extend completely through the side lamination, breaking the electrical circuit. In some embodiments, the laminae may be formed from spaced segments that are circumferentially arranged to form a generally ring-shaped structure in a transverse flux machine. Each segment may be partially electrically and/or physically separated from one another, either by cutting a generally ring-shaped laminae into segments, or forming the generally ring-shaped laminae from segments. As stated therein, however, while a larger number of cuts or segments more effectively interrupt electrical paths around a lamination stack, the complexity associated with manufacturing such lamination stacks and/or integrating such laminations stacks into a functional electrical machine may also grow with the number of cuts or segments. Accordingly, various mechanisms of joining laminae and maintaining cuts therein are described therein. Additionally, as the number of cuts grows, the voltages induced in the laminae of the lamination stacks are reduced, as each lamination stack extends a shorter angular distance around a transverse flux machine and is thus linked by less magnetic flux.

Figure 4:
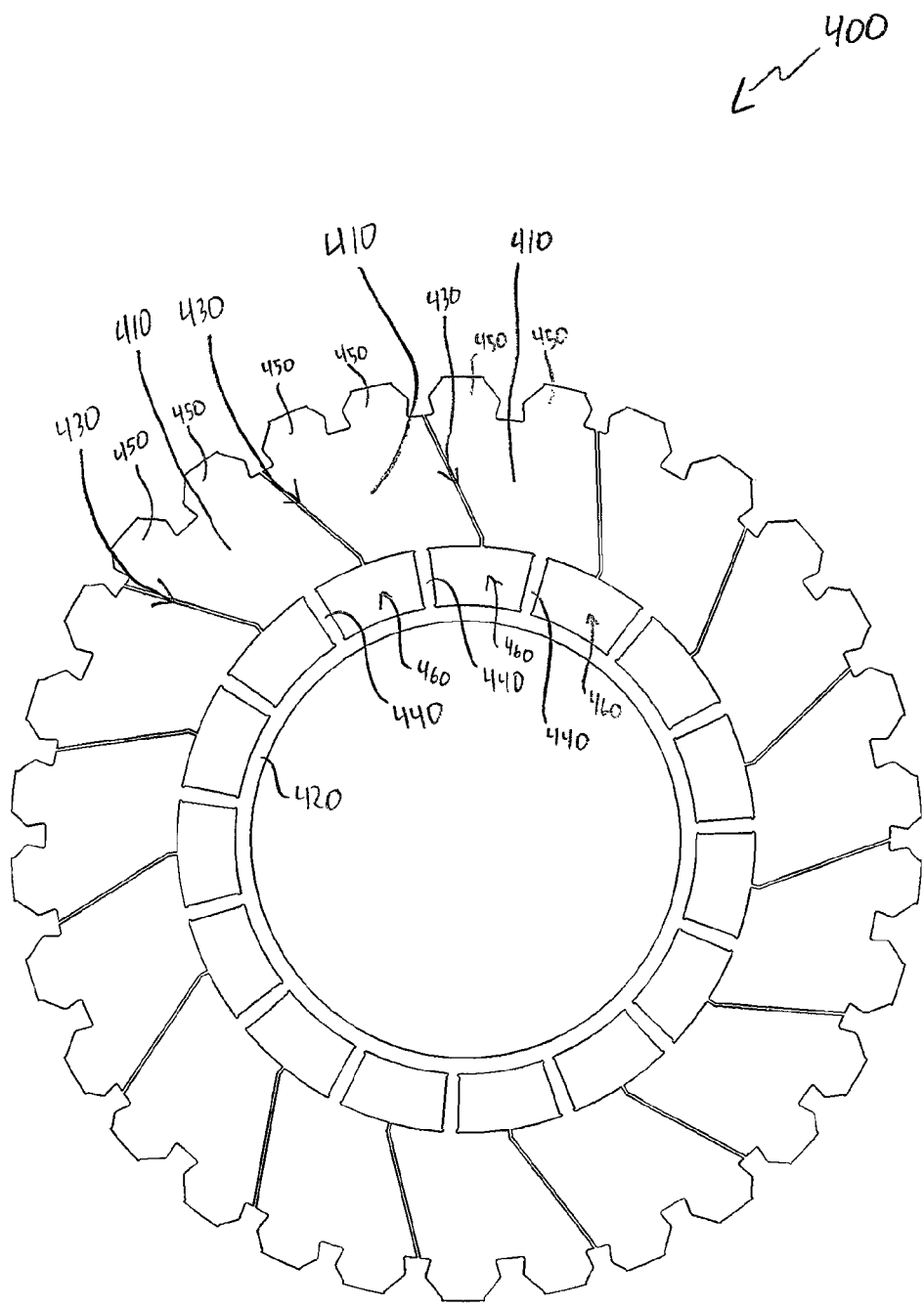
FIG. 4 illustrates an embodiment of a laminae of the present disclosure.

It is an aspect of the present disclosure that in some embodiments components of a transverse flux motor may be configured with physically unified conductive segments, which may be electrically and magnetically segmented into discrete units in a manner that prevents formation of induced eddy currents (e.g., circumferential currents) in the stator. For example, FIG. 4 illustrates a laminae 400 of the present disclosure. As shown, in an embodiment the laminae 400 is formed of a unitary layer (e.g., a sheet of metal, such as silicon steel or another suitable material having a desired electrical resistivity and/or magnetic permeability, including but not limited to those materials described above) having a plurality of segments 410 therein coupled by a common connecting ring (e.g., a hub 420 in the illustrated embodiment) spaced radially from the segments 410. In an embodiment, each segment 410 may be spaced from one another by a gap 430, such as the cuts described above. Additionally, in an embodiment each segment 410 may be coupled to the hub 420 by a radially extending beam (e.g., a spoke 440 in the illustrated embodiment), as described in greater detail below. In an embodiment, there may be only a single spoke 440 coupling each segment 410 to the hub 420. In an embodiment, the radially extending beams may connect the segments to the connecting ring as a unitary piece. For example, in the illustrated embodiment, the laminae 400 may be formed as a unitary piece comprising the segments 410, the hub 420, and the spokes 440.

As shown, each of the segments 410 may include teeth 450 thereon. In the illustrated embodiment, each segment 410 includes two teeth 450, however in other embodiments greater or fewer numbers of teeth 450 may be present. In an embodiment, there may be only a single spoke 440 for each group of teeth 450 on a segment 410. In an embodiment, the teeth may be disposed radially outward from an axis of rotation for a motor into which the laminae 400 is installed. As further shown, the gaps 430 may be angled relative to being perpendicular to the axis of rotation for the motor. While in the illustrated embodiment the gaps 430 are generally linear, in other embodiments, the gaps 430 may have a curved configuration. In some embodiments the laminae 400 may be formed as a single ring, with the gaps 430 cut therein. As further shown, the laminae 400 may include axial apertures 460 therein, between each of the spokes 440. As such, it may be appreciated that in an embodiment the gap 430 may extend from an outer perimeter of the laminae 400 into the axial apertures 460. In some embodiments, such as that illustrated, the gap 430 may extend into a trench 470 between the teeth 450. In other embodiments, the gap 430 may extend through the teeth 450 (e.g., forming a segment 410 having a partial tooth therein, where two adjacent segments 410 may together form a tooth 450 with a gap 430 therein.

As described above, a plurality of laminae 400 may be assembled together to form a lamination stack, which may be formed in any suitable manner, for example by stamping, pressing, gluing, and/or otherwise mechanically and/or chemically bonding two or more laminae 400 together. In an embodiment, the laminae 400 may be pre-shaped, and then joined to one another to form a lamination stack. The laminae 400 may also be formed from a sheet of material at the same time the laminae 400 are formed into a lamination stack (e.g., by placing multiple sheets of lamination material may on top of one another, then stamping the sheets by a die corresponding to the desired shape of a laminae 410). Such a process may thus shape the sheets of material into a plurality of laminae 400 and join the laminae 400 into a lamination stack in a single process.

FIG. 5A illustrates a lamination stack 500 comprising a plurality of laminae 400 (e.g., laminae 400a to 400n in the illustrated embodiment, each generically laminae 400). As shown, in an embodiment the laminae 400 in the lamination stack 500 may have identical shapes, aligned with one another. For example, as shown in the illustrated embodiment, one or more of the teeth 450, the gaps 430, the spokes 440 and the segments 410 of each laminae 400 may be aligned with one corresponding ones of other laminae 400. In the illustrated embodiment of lamination stack 500, each laminae 400 is generally identical to one another, and thus each of the teeth 450, the gaps 430, the spokes 440 and the segments 410 of each laminae 400 are aligned with those of the other laminae 400. It may be appreciated that when assembled with a conductive coil, described in greater detail below, the conductive coil may generate a plurality of flux loops (e.g., flux loop 510) around the lamination stack 500, which may encircle the segments 410 in the lamination stack 500. Although not beholden to any particular theory of operation, in an embodiment it may be understood that the flux loop 510 may encircle the segments 410 through the axial apertures 460 (e.g., to either side of the spokes 440 coupling the segments 410 to one another via the hub 420). Accordingly, it may be appreciated that incomplete current loops 520 at the segments 410 may be incomplete due to the gaps 430 through the lamination stack 500. Conversely, a complete current loop 530 around the hubs 420 may be outside of the path of the flux loop 510, and thus would not intersect the flux loop 510, preventing or mitigating the formation of induced circumferential currents (e.g., eddy currents) in the laminae 400.

FIG. 5B illustrates that in an embodiment the axial apertures 460 may be filled with one or more back return elements, such as back return materials 540, which may be sized and shaped to extend at least partway in an axial direction in a transverse flux machine and/or commutated flux machine. Although not shown throughout the illustrated lamination stack 500 of FIG. 5B, it may be appreciated that the other axial apertures 460 may likewise be filled with back return materials 540. In an embodiment the back return materials 540 may comprise one or more generally planar pieces of material configured to conduct magnetic flux around a magnetic coil, as described in greater detail below. In an embodiment, the back return materials 540 may comprise materials similar to the laminae 400. The exterior of back return materials 540 may also be similarly electrically insulated. In an exemplary embodiment, the back return materials 540 comprises M19 silicon steel having an electrically insulating coating. Other material compositions are additionally or alternatively possible, including but not limited to a back return material arranged in the axial apertures that comprises powdered metal, or any other appropriate material.

As shown in FIG. 5C, in an embodiment the back return materials 540 may extend from the axial apertures 460 of a first lamination stack 500 to the axial apertures 460 of a second lamination stack 500. For example, in the illustrated embodiment, the back return materials 540 extend between axial apertures 460a of a first lamination stack 500a (and through the laminae 400 thereof) and into the axial apertures 460b of a second lamination stack 500b. Although empty axial apertures 460a are shown in FIG. 5C, it may be appreciated that in an embodiment back return materials 540 may fill each of the axial apertures 460. As further shown in FIG. 5C, in an embodiment, while the axial apertures 460a and 460b may be aligned with one another to receive the back return materials 540 extending across each, the segments 410 of each of the lamination stack 500a and the lamination stack 500b may be offset from one another. Accordingly, as shown, the teeth 450b of the lamination stack 500b may be offset from the teeth 450a of the lamination stack 500a. As further shown, in an embodiment the gaps 430 of the laminae 400 of each lamination stack 500 may be angled differently. For example, in the illustrated embodiment, the gaps 430a of the lamination stack 500a are generally angled in a counterclockwise direction (i.e., as seen from the perspective view of FIG. 5C) while the gaps 430b of the lamination stack 500b are generally angled clockwise (i.e., as seen from the perspective view of FIG. 5C). It may be appreciated that other configurations are additionally or alternatively possible.

Figure 5D:
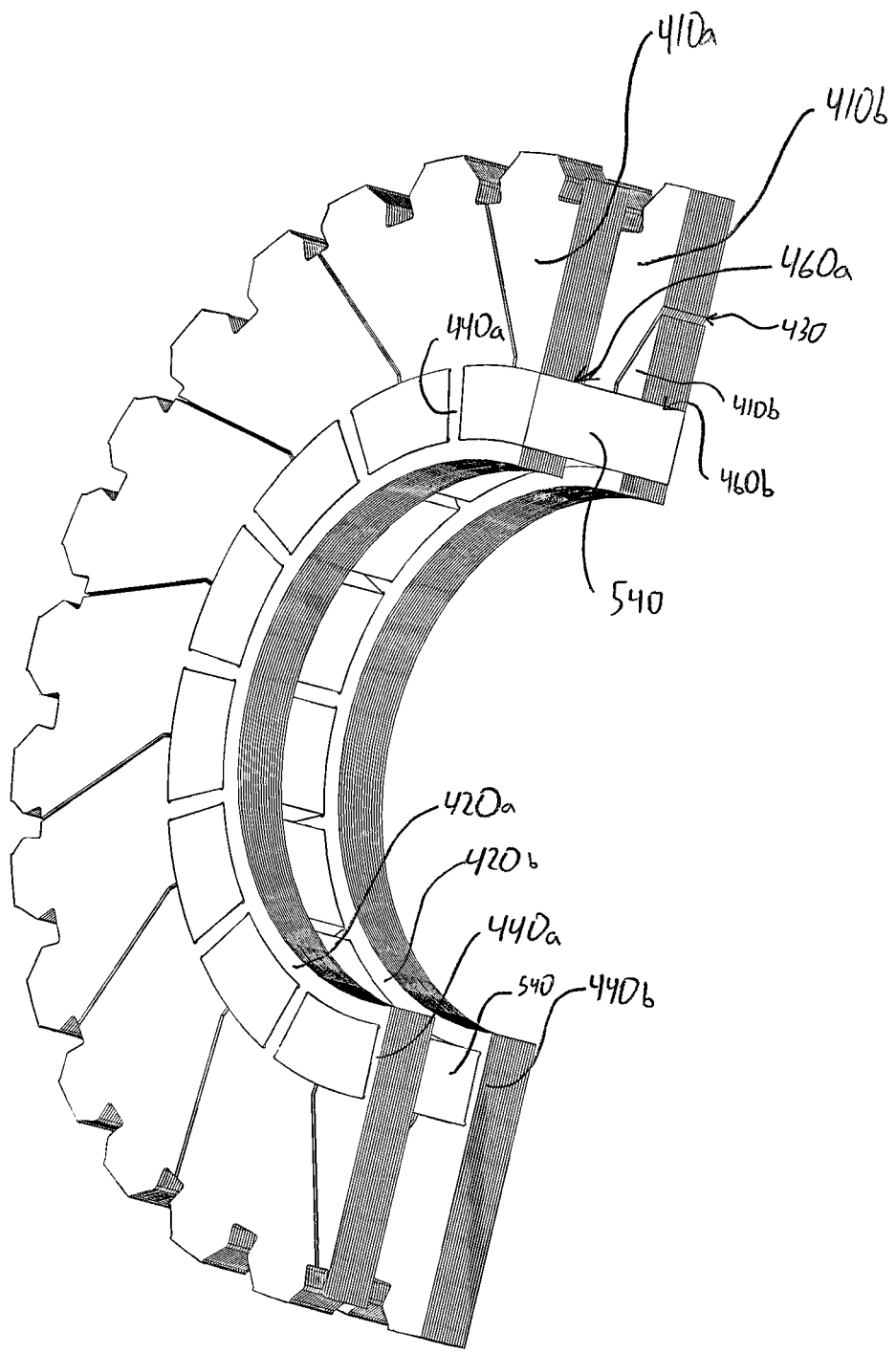
FIG. 5D illustrates a perspective cross sectional view of engagement between lamination stacks and back return material.

FIG. 5D illustrates a cross sectional view of the first lamination stack 500a, the second lamination stack 500b, and the back return materials 540 coupled therebetween. As shown in the illustrated view, each of the axial apertures 460a and 460b may be filled with back return materials 540, as described above. As further shown, the hubs 420a and 420b of each laminae 400 of the lamination stacks 500a and 500b respectively may allow the laminae 400 to be positioned on both sides of the back return materials 540. In other words, the back return materials 540 may be received between the segments 410a and the hubs 420a in the first lamination stack 500a, while the hubs 420a and segments 410a are coupled (or integrally formed) together by the posts 440a thereof. Similarly, the back return materials 540 may be received between the segments 410b and the hubs 420b in the second lamination stack 500b, while the hubs 420b and segments 410b are coupled (or integrally formed) together by the posts 440b thereof. It may be appreciated that the back return materials 540 may generally provide a path for the magnetic flux from the segments 410a of the first lamination stack 500a to the segments 410b of the second lamination stack 500b, creating flux loops (such as the flux loop 510 illustrated in FIG. 5A) around a magnetic coil therebetween, such as that described in greater detail below. Accordingly, it may be appreciated that current loops (e.g., current loop 520 in FIG. 5A) at the segments 410a and 410b may be incomplete due to the gaps 430, while a complete current loop (e.g., current loop 530 in FIG. 5A) around the hubs 420 is outside of the path of the flux loop that extends through the back return material 540. Thus, complete current loops through the hubs 420a and 420b would not intersect the flux loops traversing the segments 410a, the back return materials 540, and the segments 410b, preventing or mitigating the formation of induced circumferential currents (e.g., eddy currents) in the lamination stacks 500.

Figure 5E:
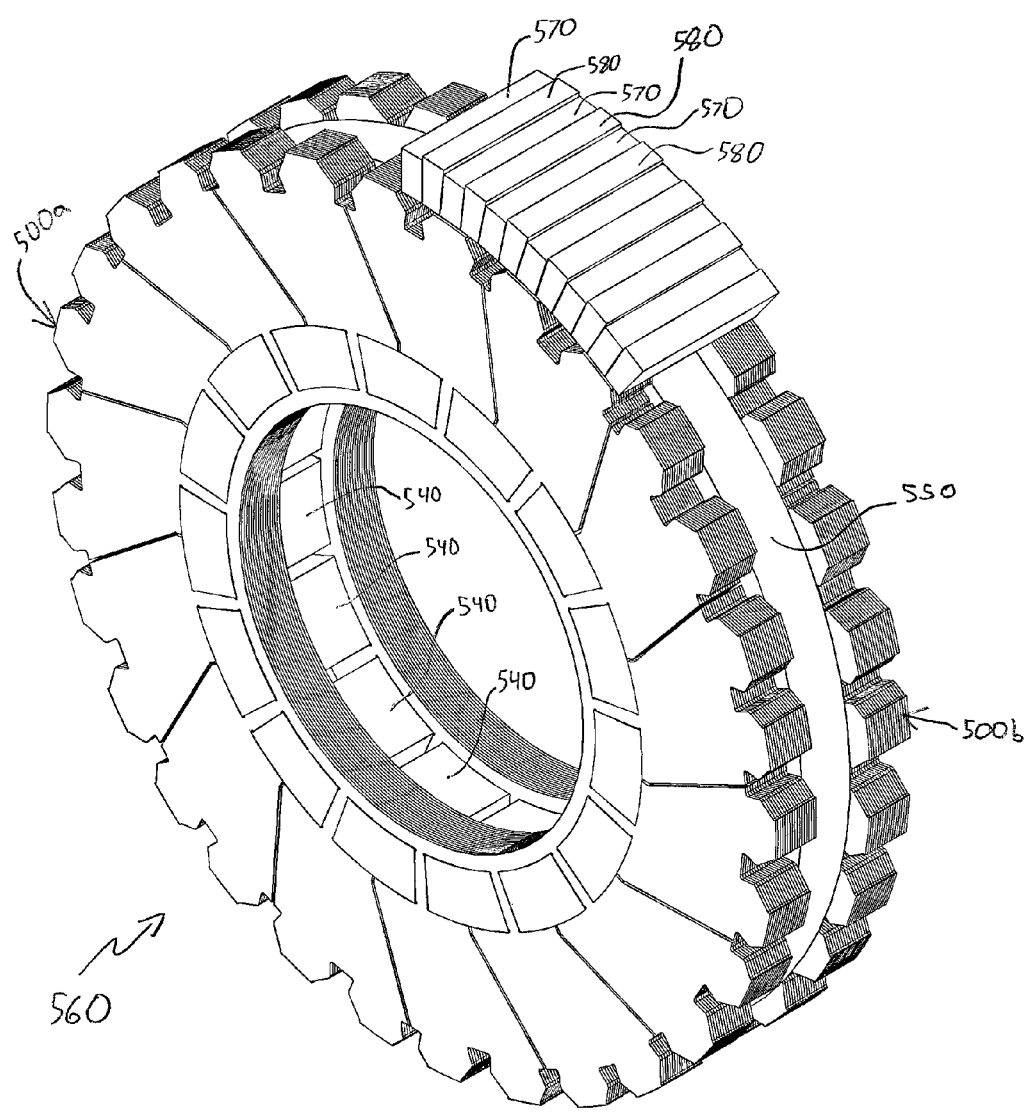
FIG. 5E illustrates a reduced perspective view showing the assembly of lamination stacks and back return material with an electromagnetic coil to form a stator assembly, coupled with a rotor to form an electrical machine.

As illustrated in FIG. 5E, in an embodiment the assembly of the lamination stacks 500 and the back return materials 540 may further include a conductive coil 550 positioned between the first lamination stack 500a and the second lamination stack 500b (in particular, between the segments 410 thereof). It may be appreciated that the conductive coil 550 may generate the magnetic flux loop 510 (e.g., through electromagnetic processes). Accordingly, the assembly of the lamination stacks 500, the back return materials 540, and the conductive coil 550, may be considered parts of an embodiment of a stator assembly 560. In an embodiment, the stator assembly 560 may be assembled a rotor to form a motor or a generator. In FIG. 5E, several flux concentrators 570 and magnets 580 of a rotor are illustrated, forming a curve generally matching the contour of the stator assembly 560. It may be appreciated that magnets 580 may be similar to the interleaved magnets 154, while the flux concentrators 570 may be similar to the flux concentrators 152, as described above. In an embodiment, the north poles of one magnet 580 may be positioned adjacent to the south pole of an adjacent magnet 580, spaced by the flux concentrator 570.

Figure 6:
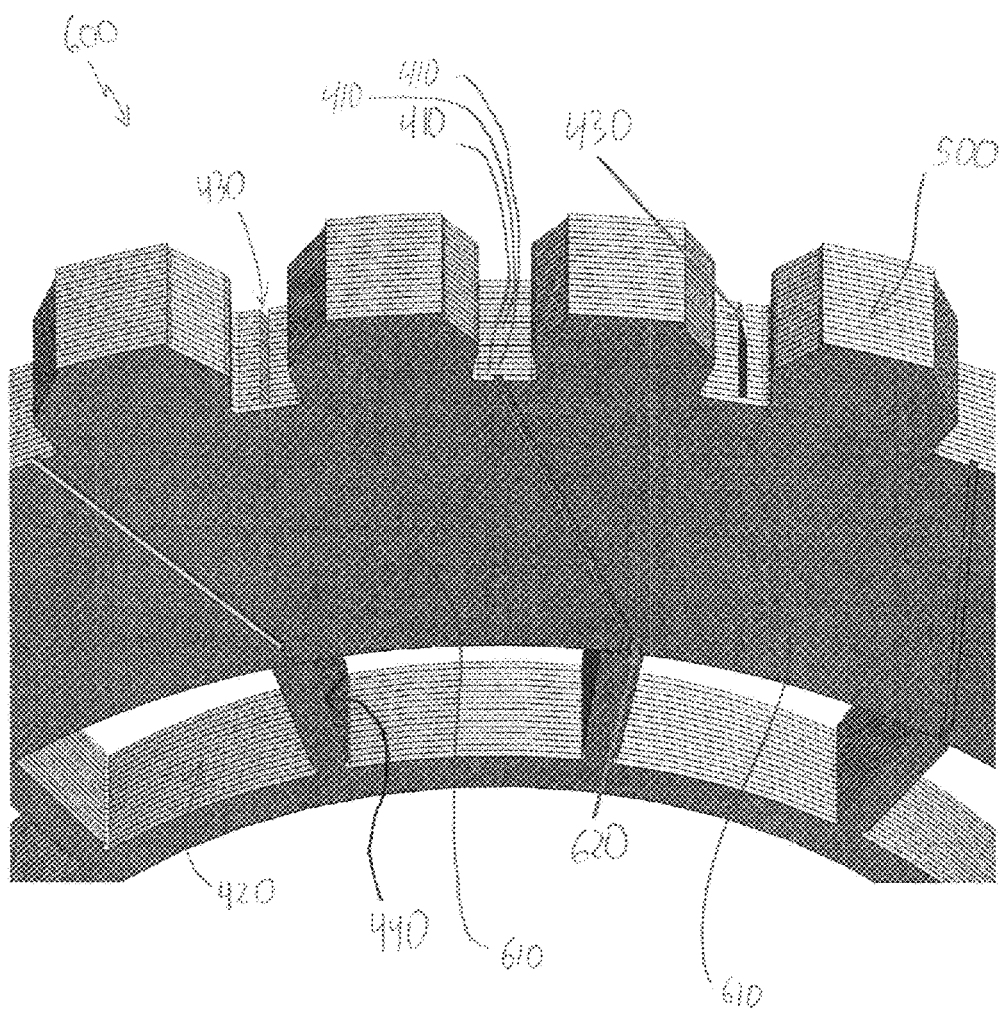
FIG. 6 illustrates an embodiment of a lamination stack assembly comprising the lamination stack of FIG. 5A and joining segments coupled thereto.

It may be appreciated that in some embodiments, the lamination stack 500 may be configured with one or more joining segments which may bridge the gaps 430 of the laminae 400 at least at a side of the lamination stack 500, and may distribute mechanical forces associated with the segments 410 to other segments 410, instead of placing an entirety of the mechanical forces on the spokes 440. In an embodiment, there may be generally one joining segment per tooth group. As shown in FIG. 6, a lamination stack assembly 600 may comprise the lamination stack 500 (formed from the plurality of laminae 400), assembled with joining segments 610. It may be appreciated that since flux links may be absent from around the outer side lamination(s) in some embodiments of transverse flux machines, the joining segments 610 may bridge the gaps 430 in a manner that forms a mechanically sound structure, with less stringent requirements for interlaminar electrical insulation than may otherwise be found within the lamination stack 500. In some embodiments, such as that illustrated in FIG. 6, the joining segments 610 may be similar to segments 410, however may be bricklayed (e.g., positioned in staggered relation) relative to the segments 410. As shown, in an embodiment the joining segments 610 may themselves be separated by joining segment gaps 620, which in some embodiments may be aligned with the spokes 440 of the laminae 400. In an embodiment, the joining segments 610 may comprise their own associated spokes and hub. In such an embodiment, the hub associated with the joining segments 610 may be laminated with the hub 420, while at least a subset of the spokes associated with the joining segments 610 may be aligned with one or more of the spokes 440 of the laminae 400. In an embodiment, by configuring the joining segments 610 in an at least partially offset and/or overlapping manner between segments 410, the joining segments 610 may each be least partially electrically and/or physically separated and/or insulated from one another. In an embodiment, as flux links do not surround the outermost lamination, the joining segments 610 may be integrally formed with one another, without having joining segment gaps 620 formed therein.

It may be appreciated that the laminae 400, the lamination stack 500, and the lamination stack assembly 600 described above are exemplary of embodiments of the stator configuration described herein. It may also be appreciated that other stator configurations are also possible within the scope of the present disclosure.

Figure 7:
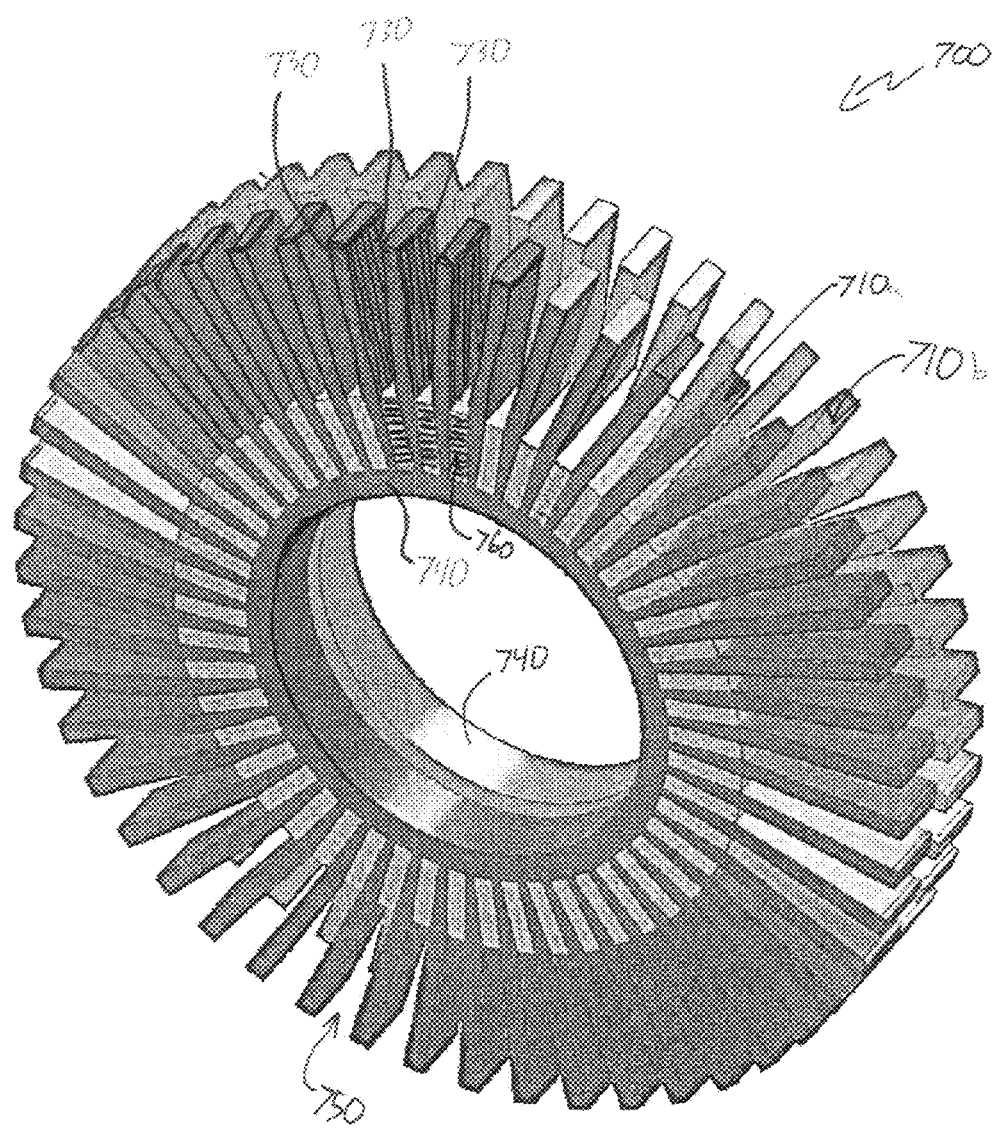
FIG. 7 illustrates another embodiment of a lamination stack assembly of the present disclosure.

For example, FIG. 7 illustrates a lamination stack assembly 700 comprising a pair of lamination stacks 710 (individually lamination stack 710a and lamination stack 710b). Each lamination stack 710 includes a plurality of laminae 720 having segments 730 extending axially away from a central hub 740. Although illustrated as having an annular configuration, any other shape of the central hub 740 is also possible in other embodiments, including but not limited to a regular or irregular polygonal shape, which may or may not have recesses, apertures, or other features formed therein. In an embodiment, the segments 730 may define gaps 750 therebetween, which may be at least partially filled with back return lamination materials 760, which may be sized and shaped to extend at least partway in an axial direction in a transverse flux machine and/or commutated flux machine, and may extend across the lamination stacks 710. In an embodiment the back return lamination materials 760 may comprise one or more generally planar pieces of material configured to conduct magnetic flux. In an embodiment, the back return lamination materials 760 may comprise materials similar to the laminae 720. In an embodiment, the exterior of the back return lamination materials 760 may be electrically insulated (e.g., from the segments 730). It may be appreciated that in an embodiment the central hub 740 may be positioned out of the flux path of the electrical machine, allowing mechanical coupling of the segments 730 without interfering with the operation (e.g., through induction of circumferential/eddy currents) in the laminae 720.

Figure 8:
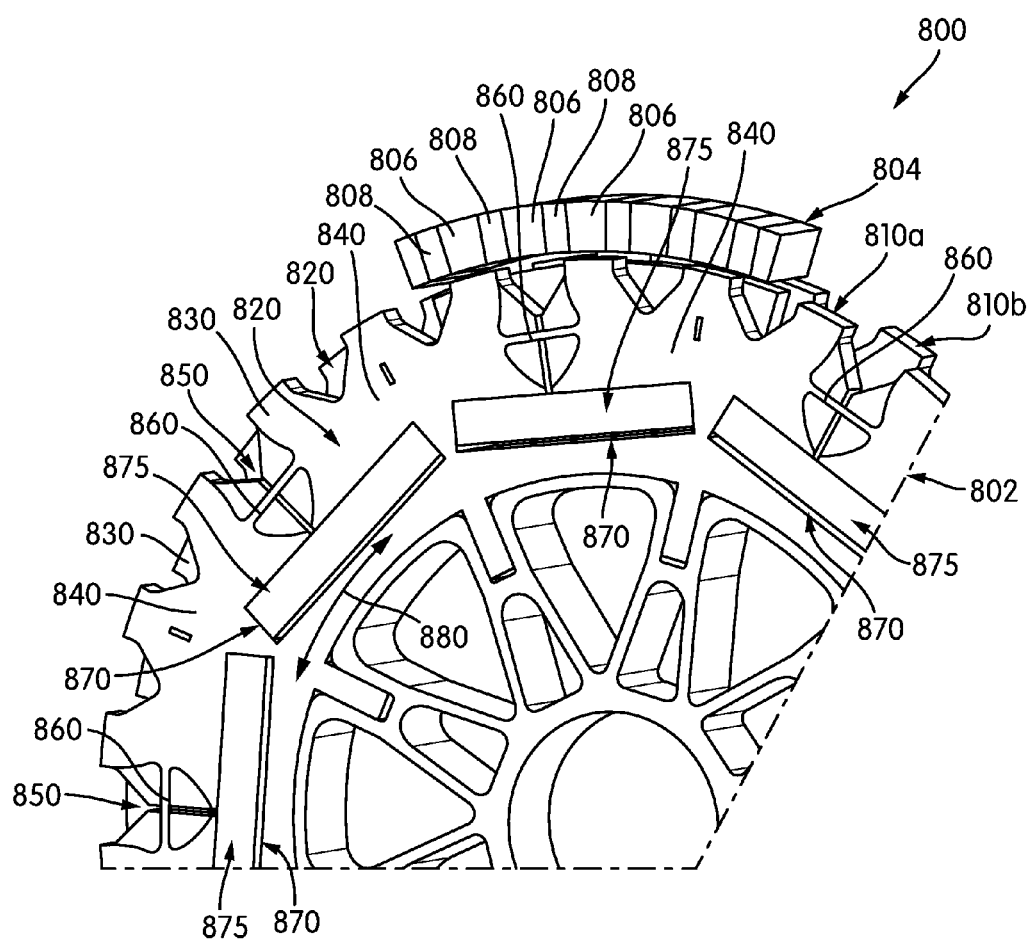
FIG. 8 illustrates another embodiment of an electrical machine of the present disclosure.

As another example, FIG. 8 illustrates a partial view of an electrical machine 800 including a stator assembly 802 and a motor assembly 804 (shown in reduced form). The motor assembly 804 includes magnets 806 separated by flux concentrators 808. The stator assembly 802 includes a pair of lamination stacks 810 (individually lamination stack 810a and lamination stack 810b). It may be appreciated that each lamination stack 810 may include one or more laminae 820. In the illustrated embodiment, the laminae forming the lamination stack 810 may be of a generally solid and non-skeletal configuration, having teeth 830 formed at an outer perimeter thereof. In an embodiment, segments 840 may be formed in the lamination stacks 810, separated by gaps 850. In the illustrated embodiment, a resistive structural support 860 may extend across the gaps 850 at an outer lamination (such as is visible in the view of lamination stack 810a), and may couple the segments 840. The resistive structural supports 860 are optional, and may be omitted in some embodiments. When utilized, such resistive structural supports 860, similar to the joining segments 610 described above, may provide additional structural rigidity to the segments 840. As shown in the illustrated embodiment, the gaps 850 may extend into axial apertures 870 formed in the laminations 820, which may be filled with back return materials 875. In an embodiment, the back return materials 875 may include laminations extending from one lamination stack 810 to another, or may include powdered metal portions shaped accordingly. It may be appreciated that a region 880 of the lamination stacks 810 on the other side of the axial apertures 870 (and back return materials 875) from the teeth 830 may be outside of a flux path established by the segments 840 and the back return materials 875 in the axial apertures 870. Accordingly, it may be appreciated that in an embodiment the region 880 outside the flux path need not be spaced from the segments 840 (e.g., as the hub 420 was by the spokes 440 in FIGS. 4-6), but may be defined through the cutting or other formation of the axial apertures 870 in an otherwise generally solid and non-skeletal lamination stack such as the lamination stacks 810.

Figure 9:
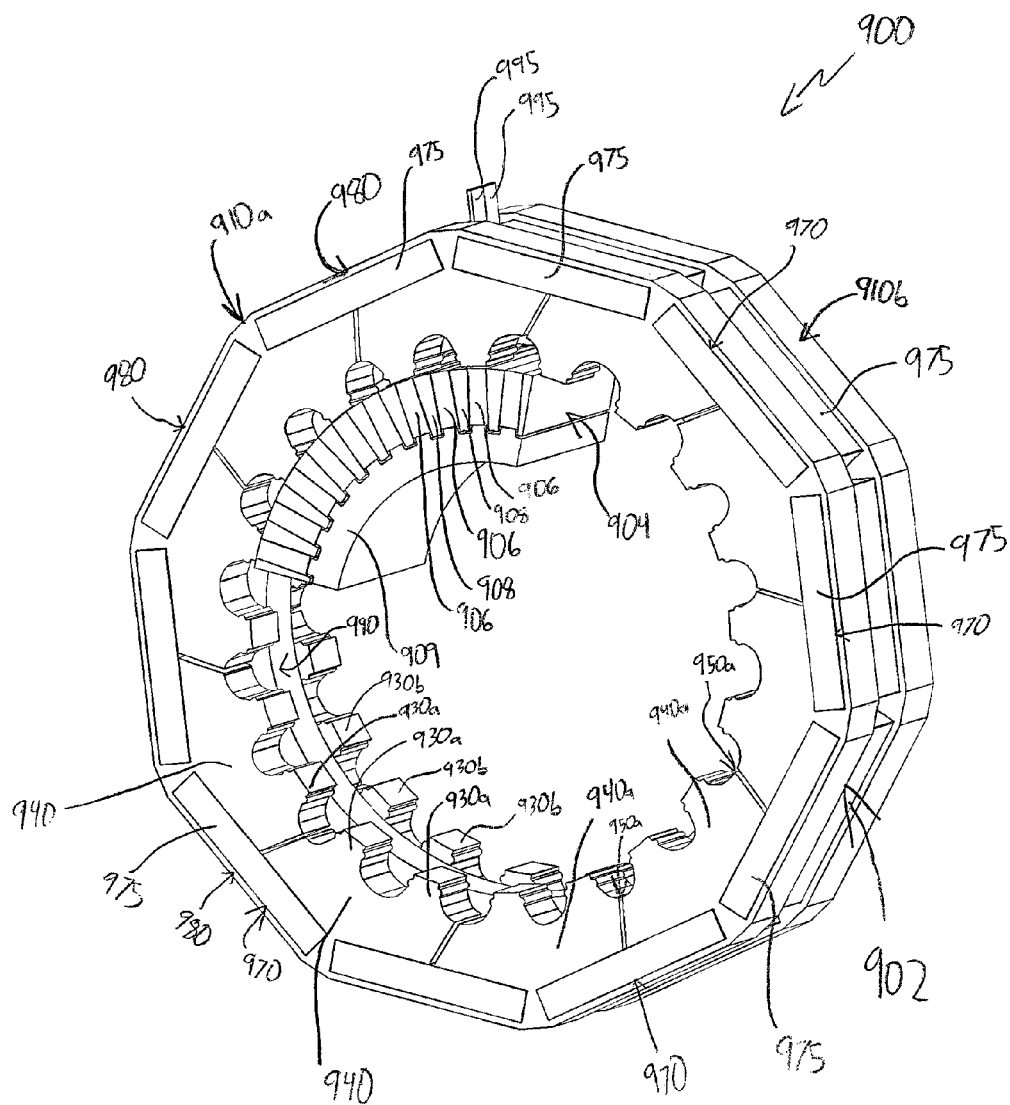
FIG. 9 illustrates another embodiment of an electrical machine of the present disclosure, having an inner rotor configuration.

As shown in FIG. 9, the stators described herein may be configured for an inner rotator or outer rotator configuration. For example, FIG. 9 illustrates a partial view of an electrical machine 900 including a stator assembly 902 and a motor assembly 904 (shown in reduced form). Similarly to the electrical machine 800, the motor assembly 904 includes flux concentrators 906 separating magnets 908. In the illustrated embodiment, the magnets 908 and flux concentrators 906 are assembled on a support structure 909 for the motor assembly 904.

In an embodiment, the stator assembly 902 of the electrical machine 900 includes a plurality of lamination stacks 910 (individually lamination stack 910a and lamination stack 910b). It may be appreciated that in an embodiment, each lamination stack 910 may include one or more laminae therein (not shown). In an embodiment, each lamination stack 910 (and/or the laminae thereof) may be of a generally solid and non-skeletal configuration, having teeth 930 formed in an inner perimeter thereof (e.g., the teeth 930a of the lamination stack 910a, and the teeth 930b of the lamination stack 910b), which may match a contour of the motor assembly 904. In an embodiment, segments 940 may be formed in the lamination stacks 910, separated by gaps 950 (specifically segments 940a and gaps 950a in the lamination stack 910a). Complementary segments and gaps in the lamination stack 910b are obscured in the perspective view of FIG. 9.

As shown in the illustrated embodiment, the gaps 950 may extend into axial apertures 970 formed in the laminations, which may be filled with back return materials 975. In an embodiment, the back return materials 975 may include laminations extending from one lamination stack 910 to another (e.g., lamination stack 910a to lamination stack 910b in the illustrated embodiment), or may include powdered metal portions shaped accordingly. It may be appreciated that a region 980 of the lamination stacks 910 on the other side of the axial apertures 970 (and back return materials 975) from the teeth 930 may be outside of a flux path established by the segments 940 and the back return materials 975 in the axial apertures 970. Accordingly, it may be appreciated that in an embodiment the region 980 outside the flux path need not be formed spaced from the segments 940 (e.g., as the hub 420 was by the spokes 440 in FIGS. 4-6), but may be defined through the cutting or other formation of the axial apertures 970 in an otherwise generally solid and non-skeletal lamination stack such as the lamination stacks 910.

Further shown between the lamination stack 910a and the lamination stack 910b is a conductive coil 990, configured to generate a plurality of flux loops in the stator, around the lamination stacks 910. As shown in the illustrated embodiment of FIG. 9, in an embodiment leads 995 extending from the conductive coil 990 may protrude from the stator assembly 902, in a position so as to not interfere with the rotor 904.

As shown, in an embodiment the leads 995 may pass between an adjacent pair of back return materials 975 in the stator assembly 902.

It may be appreciated that principles of the present disclosure may suitably be combined with any number of principles disclosed in any one or more of the U.S. patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Accordingly, although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electrical machine, comprising:
a rotor for rotation about a rotational axis;
an electroconductive coil arranged circumferentially with respect to and fully encircling the rotational axis; and
a stator assembly comprising:
a first lamination stack comprising a first plurality of laminae, the first stack being arranged circumferentially with respect to the rotational axis on a first, side of the coil for conducting magnetic flux;
a second lamination stack comprising a second plurality of laminae; the second stack being arranged circumferentially with respect to the rotational axis on a second side of the coil for conducting magnetic flux;
wherein the first lamination stack and the second lamination stack are each configured with a plurality of gaps generally radially through the laminae thereof, the gaps in the laminae of each lamination stack defining a plurality of separate circumferential segments in each laminae, to prevent a continuous electrical circuit around the rotational axis from being created in the plurality of separate circumferential segments,
wherein the electrical machine is at least one of a transverse flux machine or a commutated flux machine;
each laminae having a connecting ring spaced radially from said circumferential segments thereof and radially extending beams connecting said circumferential segments to said connecting ring as a unitary piece; and
a plurality of back return elements arranged circumferentially with respect to the rotational axis and extending axially between the first and second lamination stacks to provide a magnetic flux path therebetween, each back return element being positioned circumferentially between adjacent parts of said radially extending beams and radially between said segments and said connecting ring.

2. The electrical machine of claim 1, wherein the gaps are configured to prevent creation of a continuous electrical circuit around the rotational axis in the laminae of each lamination stack.

3. The electrical machine of claim 2, wherein the gap comprises one or more linear segments.

4. The electrical machine of claim 3, wherein the one or more linear segments are angled offset from perpendicular to the rotational axis.

5. The electrical machine of claim 2, wherein the gaps extend from an outer perimeter of the each laminae into an axial aperture positioned between the connecting ring and both the circumferential segments, the axial aperture configured to receive the back return elements therein.

6. The electrical machine of claim 5, wherein the back return elements comprise one or more back return lamination materials configured to conduct the magnetic flux in the electrical machine.

7. The electrical machine of claim 6, wherein the one or more back return lamination materials comprise silicon steel.

8. The electrical machine of claim 5, wherein the back return elements comprise powdered metal configured to conduct the magnetic flux in the electrical machine.

9. The electrical machine of claim 1, further comprising a joining segment coupled to an outer face of an outer laminae of the first plurality of laminae, the joining segment extending across a gap between a first segment and a second segment of the plurality of circumferential segments in the outer laminae.

10. The electrical machine of claim 1, wherein the rotator is located radially inward from the stator assembly.

11. The electrical machine of claim 1, wherein the connecting ring of each laminae comprises a ring shaped structure surrounding the rotational axis, wherein the plurality of circumferential segments are disposed about the connecting ring.

12. The electrical machine of claim 1, wherein the plurality of circumferential segments are evenly distributed about the connecting ring.

13. The electrical machine of claim 1, wherein a complete electrically conductive loop is formed at the connecting ring, outside of a path of flux loop around portions of the first lamination stack, the second lamination stack, and the plurality of back return elements, while a spaced relation between the plurality of separate circumferential segments prevents a complete current loop intersecting the flux loop.

14. The electrical machine of claim 1, wherein the unitary layer comprises a sheet of silicon steel.

15. The electrical machine of claim 1, wherein the electrical machine is a motor, and wherein a current applied to the coil induces magnetic flux in the plurality of laminae and the back return material to rotate the rotor.

16. The electrical machine of claim 1, wherein the electrical machine is a generator, and wherein rotation of the rotor generates magnetic flux in the plurality of laminae and the back return material to induce current in the coil.

17. The electrical machine of claim 1, wherein the connecting ring comprises one or more of an arcuate configuration and a polygonal configuration.

18. A method of manufacturing a stator for assembly with a rotor form an electrical machine, the method comprising:
    forming a plurality of laminae, each laminae being formed of a unitary piece comprising a plurality of gaps defining a plurality of separate circumferential segments therein, coupled to a connecting ring spaced radially from the circumferential segments by radially extending beams, the gaps extending radially through each of the plurality of laminae to prevent a continuous electrical circuit around the rotational axis from being created in the laminae;
    forming first and second lamination stacks from the plurality of laminae;
    assembling the first lamination stack circumferentially with respect to a rotational axis of the electrical machine on a first side of an electroconductive coil for conducting magnetic flux;
    assembling the second lamination stack circumferentially with respect to the rotational axis on a second side of the electroconductive coil for conducting magnetic flux; and
    arranging a plurality of back return elements circumferentially with respect to the rotational axis and extending axially between the first and second lamination stacks to provide a magnetic flux path therebetween, each back return element being positioned circumferentially between adjacent parts of said radially extending beams and radially between said segments and said connecting ring.

19. The method of claim 18, wherein the back return elements comprise one or more of powdered metal and silicon steel.

20. The method of claim 18, wherein the unitary piece of each of the plurality of laminae comprises silicon steel.

\* \* \* \* \*